United States Patent [19]

Brosenius et al.

[11] 4,261,337
[45] Apr. 14, 1981

[54] SOLAR ENERGY COLLECTOR

[75] Inventors: Karl H. Brosenius; Arne Logdberg, both of Stockholm, Sweden

[73] Assignee: Tekram Associates, North Haven, Conn.

[21] Appl. No.: 19,290

[22] Filed: Mar. 9, 1979

[30] Foreign Application Priority Data

Jun. 10, 1978 [SE] Sweden ................................. 7810462

[51] Int. Cl.³ ................................................ F24J 3/02
[52] U.S. Cl. ..................................... 126/450; 126/432
[58] Field of Search ............... 126/432, 445, 449, 450, 126/417, 428; 202/134, 136; 203/DIG. 1

[56] References Cited

U.S. PATENT DOCUMENTS

| | | | |
|---|---|---|---|
| 2,843,536 | 7/1958 | Mount | 126/271 |
| 3,513,828 | 3/1970 | Masters | 126/271 |
| 3,894,528 | 7/1975 | Stubblefield | 126/271 |
| 3,939,818 | 2/1976 | Hamilton | 126/271 |
| 3,943,911 | 3/1976 | Yu | 126/432 |
| 3,991,742 | 11/1976 | Gerber | 126/271 |
| 4,003,365 | 1/1977 | Wiegand | 126/271 |
| 4,004,380 | 1/1977 | Kwake | 126/271 |
| 4,018,211 | 4/1977 | Barr | 126/270 |
| 4,029,081 | 6/1977 | Strong | 126/271 |
| 4,079,726 | 3/1978 | Voelker | 126/271 |
| 4,085,732 | 4/1978 | Hysom | 126/270 |
| 4,099,559 | 7/1978 | Butt | 165/170 |
| 4,116,220 | 9/1978 | Burd | 126/271 |
| 4,121,568 | 10/1978 | Olsen | 126/271 |
| 4,124,020 | 11/1978 | Noble | 126/271 |
| 4,141,498 | 2/1979 | Marschner | 126/437 |

FOREIGN PATENT DOCUMENTS 2419099  11/1975  Fed. Rep. of Germany .

Primary Examiner—Samuel Scott
Assistant Examiner—G. Anderson
Attorney, Agent, or Firm—James & Franklin

[57] ABSTRACT

The solar heat collector includes an enclosure having a solar energy transmitting cover member and a solar energy absorbing base member. Within the enclosure, structure is provided, connected to a fluid inlet, for causing a stream or film of fluid to flow along the interior surface of the cover member. The same structure may be used to impart a separate flow of fluid along the energy absorbing base member. The cover member is oriented to prevent the gravitational forces on the fluid stream, flowing along the interior surface of the cover member, from overcoming the adhesion forces between the stream and the interior surface of the cover member. This stream removes condensation from the cover member as it captures heat therefrom. The stream may be created by spraying fluid on the interior surface of the cover member or by a fluid dispensing member having a fluid outlet adjacent the interior surface of the cover. Means for distributing the fluid across the interior surface as same flows therealong may also be provided.

7 Claims, 7 Drawing Figures

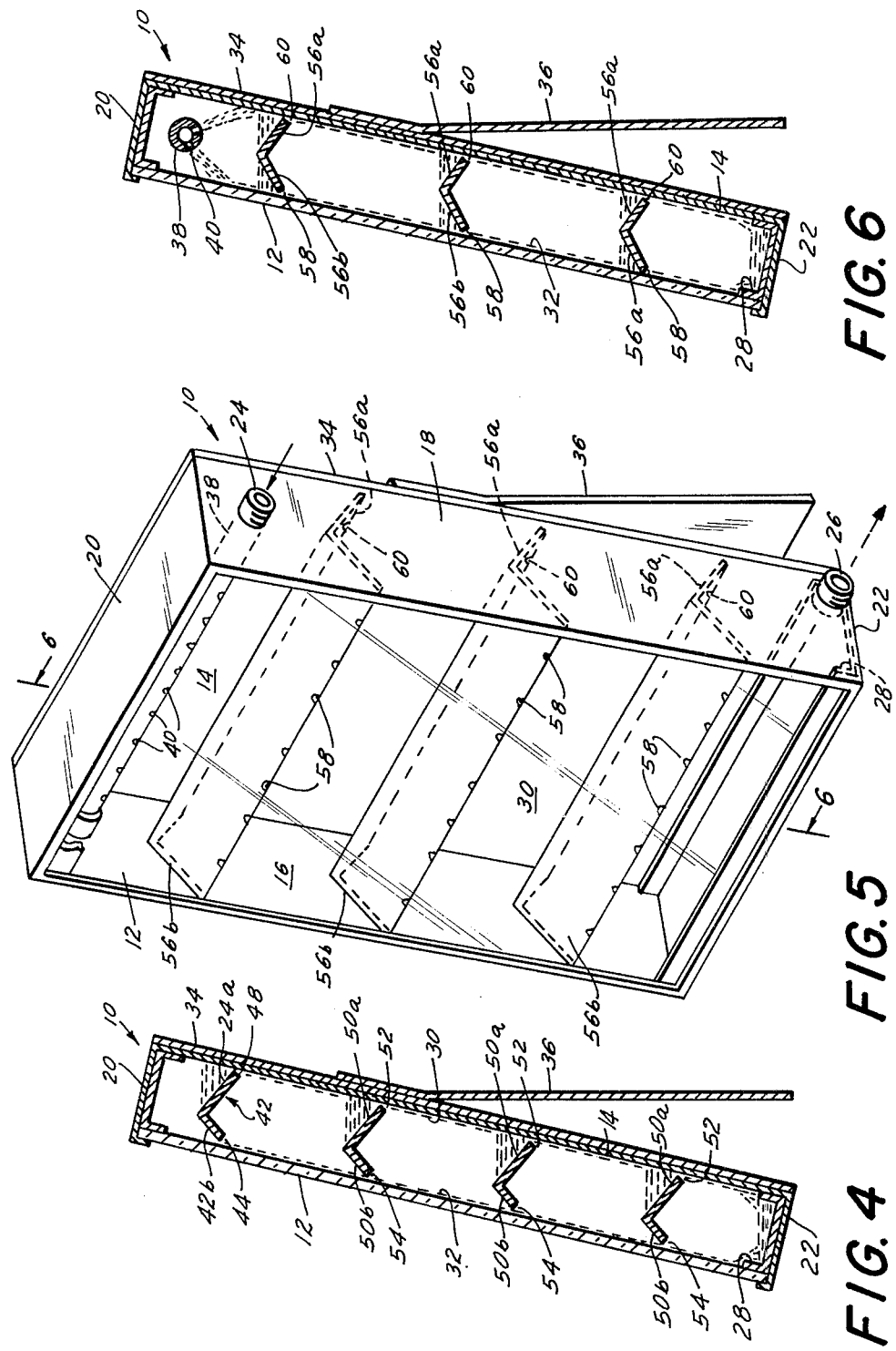

SOLAR ENERGY COLLECTOR

The present invention relates to solar energy heat collectors and, more particularly, to an improved solar energy collector wherein the stream of fluid is created along the interior surface of the cover member to remove condensation and capture heat therefrom.

Devices for collecting solar energy and imparting same to a transfer medium, such as a fluid, from which the energy is thereafter extracted and used for heating or other purposes, are known in a variety of forms. Collectors of this type commonly include an enclosure having a solar energy transmitting cover member, and spaced therefrom, a solar energy absorbing base member. The cover member is normally made of glass or transparent plastic which may be one or more layers thick. The energy absorbing base member is made of corrosion-resistant material, such as aluminum, which has a black, energy absorbing layer coated thereon. The enclosure is sealed from the environment to prevent evaporation of the fluid and is provided with fluid inlet and outlet ports situated near the top and bottom thereof, respectively.

The operation of this type of solar collector is quite simple. Fluid, such as water or the like, is pumped from a reservoir through a supply conduit to the inlet port of the enclosure. The fluid enters the top of the enclosure and is caused by gravity to flow downwardly along the energy absorbing surface of the base member from which it captures heat energy. The fluid is thereafter collected at the bottom of the enclosure and travels through the outlet port along a return conduit. The fluid then flows into a heat exchanger wherein the heat contained therein is extracted.

The collector is adapted to be mounted on an incline facing the sun, for instance, on the roof of a building or the like. Light from the sun passes through the transparent cover member and strikes the energy absorbing surface of the base member, heating same. As the fluid flows over the energy absorbing surface of the base member, the heat therein is captured by the fluid and transported thereby to the heat exchanger. The entire system is sealed from the environment to prevent loss of the fluid through evaporation.

Such collectors are relatively inexpensive to produce on a small scale because they are normally made of plastic or other suitable inexpensive materials and the piping may also be made of plastic. Because this system is closed, fluid losses are minimal. However, the problem with collectors of this type is that they are inefficient in that they are capble of capturing only a relatively small percentage of the solar energy which is imparted thereto. For this reason, in order to collect sufficient quantities of energy to be practical, the collectors themselves must be extremely large and, thus, costly. Because of this, systems such as described are, in most cases, uneconomical when compared to energy systems utilizing conventional fuels.

Obviously, the efficiency of such solar energy collectors is related to the total amount of heat which can be captured by the fluid as it flows over the energy absorbing surface of the base member. The amount of heat which can be captured by the fluid is dependent upon the amount of energy which reaches the energy absorbing surface, and the size of the collector. Unfortunately, the amount of energy which reaches the energy absorbing surface is severely limited by the operating characteristics of conventional solar energy collectors.

As operation of the conventional solar energy collector commences, a high percentage of the solar energy which reaches the transparent cover plate is transmitted to the energy absorbing surface of the base member. However, once the energy absorbing surface of the base member becomes heated, the fluid flowing thereover begins to evaporate, and a portion of the evaporated fluid condenses on the interior surfaces of the enclosure and, particularly, on the interior surface of the cover member. As condensation increases, more and more evaporation is possible until a state of equilibrium is reached. The condensation forms a "fog" or "mist" on the interior surface of the glass cover.

The presence of condensation on the interior surface of the cover member is detrimental to the operation of the collector for several reasons. First, the condensation acts as a barrier preventing part of the light from reaching the energy absorbing surface of the base member. Thus, the amount of energy reaching the energy absorbing surface of the base member and, therefore, being transferred to the fluid, is severely reduced. Second, the condensation, as it forms, heats the interior surface of the glass cover member. The heat given off by the condensing fluid is the heat originally captured by the fluid as same evaporated from the energy absorbing surface of the base member. Thus, during evaporation, the fluid extracts energy from the energy absorbing surface of the base member which, otherwise, would be usefully employed. During condensation, this heat of evaporation is imparted to the cover member and is lost to the environment.

In addition, if the enclosure is not completely sealed, certain quantities of vapor will escape to the environment. The escaping vapor cools the enclosure because it takes with it the heat of evaporation extracted from the heat absorbing surfce of the base member. While it is possible to utilize sealing structures of known configurations to prevent the escape of vapor, it is often less expensive merely to replace the fluid which is lost through evaporation instead of constructing the system on a completely sealed basis.

Another reason for the inefficiency of conventional solar energy collectors relates to the fact that a great deal of heat energy is lost to the environment through the cover member. The cover member itself is heated to a certain degree as sunlight passes therethrough into the enclosure, by light reflected from the energy absorbing surface of the base member, by convection through the heated air within the enclosure and by the heat given off by condensation of the vapor within the enclosure. In conventional solar energy collectors, none of the heat which is imparted to the cover member can be collected or retained and all is lost to the environment.

It is, therefore, a prime object of the present invention to provide a solar energy collector with improved efficiency of operation.

It is another object of the present invention to provide a solar energy collector wherein the condensation on the interior suface of the cover member is continuously removed, such that same does not prevent the sunlight from reaching the energy absorbing surface of the base member.

It is a still further object of the present invention to provide a solar energy collector wherein the energy imparted to the cover member is collected and utilized.

It is still another object of the present invention to provide a solar energy collector wherein vapor losses from the enclosure are significantly reduced by diminishing the vapor pressure therein.

It is still a further object of the present invention to provide a solar energy collector wherein condensation from the interior surface of the cover member is removed and heat from the cover member is captured by causing a stream of fluid to flow along the interior surface of the cover member.

It is still another object of the present invention to provide a solar energy collector wherein the stream of fluid is created by spraying fluid onto the interior surface of the cover member.

It is still another object of the present invention to provide a solar energy collector wherein the stream of fluid is created by dispensing fluid onto the interior surface of the cover member.

It is still another object of the present invention to provide a solar energy collector of improved efficiency which can be manufactured, installed and operated for approximately the same costs as conventional solar energy collectors.

In accordance with the present invention, a solar energy collector is provided comprising an enclosure including a solar energy transmitting member with an interior surface, and fluid inlet and outlet ports. Means, operably connected to the fluid inlet port, are provided for causing a stream of fluid to flow along the interior surface of the solar energy transmitting member. The solar energy transmitting member is oriented to prevent the gravitational forces on the stream from overcoming the adhesion forces between the stream and the interior surface of the solar energy transmitting member. Means, connected to the fluid outlet port, are provided to collect the fluid from the interior surface of the solar energy transmitting member.

The present invention utilizes the principle that adhesion forces between a fluid and a surface will cause the fluid to cling to the surface. Even if the surface is turned upside-down, a certain amount of fluid will adhere thereto because of these forces. However, if the surface is inclined with respect to the horizontal, at least some of the fluid will adhere to and form a continuous stream which will move along the surface towards the bottom thereof. If the angle of inclination of the surface with respect to the horizontal is chosen appropriately, virtually all of the fluid which imparted to the upper portion of the surface will stream along the surface as a thin firm to the bottom portion thereof. The angle of inclination is to be chosen such that the surface is oriented to prevent the gravitational forces on the fluid stream from overcoming the adhesion forces between the stream and the surface.

It has been experimentally determined that when a relatively smooth glass or plastic surface is utilized, water or other similar fluid will stream along the surface, instead of dropping therefrom, as long as the surface is inclined from the vertical by an angle no greater than 60°. In other words, as long as the cover member is inclined with respect to the horizontal by an angle greater than 30°, fluid imparted to the upper portion thereof will stream along the surface as a thin film to the bottom portion thereof, instead of dropping off the surface, because the adhesion forces between the fluid and the surface are greater than the gravitational forces on the fluid.

In one preferred embodiment of the present invention, the stream causing means comprises means for spraying the fluid on the interior surface of the energy transmitting member. The spraying means comprises a fluid conduit having an aperture therein. Means are provided, operatively connected to the fluid inlet, for directing the fluid, under pressure, into the conduit. In another preferred form of the present invention, the stream causing means comprises structure to dispense fluid directly to the interior surface of the cover member.

The enclosure also comprises a base member having a solar energy absorbing surface. The base member is spaced from the interior surface of the energy transmitting member. In a preferable form of the invention, means operably connected to the fluid source, are provided for directing a flow of fluid along the energy absorbing surface of the base member. The energy absorbing surface of the base member is situated in face-to-face spaced relationship with the interior surface of the energy transmitting member.

The flow directing structure may comprise means for spraying the fluid onto the surface of the base member. Preferably, the means for spraying the energy absorbing surface of the base member comprises a fluid conduit having an aperture therein and means, operably connected to the fluid source, for directing the fluid into the conduit under pressure.

The means for spraying fluid onto the interior surface of the energy transmitting member and the means for spraying fluid onto the energy absorbing surface of the base member preferably comprise a single fluid conduit having first and second sets of apertures therein. The first set of apertures is directed towards the interior surface of the energy transmitting member. The second set of apertures is directed towards the energy absorbing surface of the base member. Means, operably connected to the fluid source, are provided for directing fluid into the conduit under pressure. With this configuration, a single conduit, having separate sets of apertures, one set directed toward the interior surface of the cover member and the other set directed towards the energy absorbing surface of the base member, performs both spraying operations simultaneously.

The stream causing means may alternately comprise means for dispensing the fluid directly onto the interior surface of the cover member. The dispensing means comprises a fluid retaining means such as a trough having outlet means located in proximity to the interior surface of the energy transmitting member. In one form, the retaining means comprises a trough having a portion located near the interior surface of the energy transmitting member. The fluid outlet means comprises an opening in the portion which may be created by spacing the portion from the interior surface of the cover member or comprise an aperture in the trough adjacent the energy absorbing surface of the base member.

Moreover, the stream causing means and the flow directing means may comprise a single fluid dispensing through situated between the interior surface of the energy transmitting member and the energy absorbing surface of the base member. The trough has first fluid outlet means adjacent the interior surface of the energy transmitting member and second fluid outlet means adjacent the energy absorbing surface of the base member. Means for operably connecting the conduit to the fluid source is provided.

In addition, means for distributing the fluid can be utilized in conjunction with any of the stream forming means and/or flow directing means described above. The fluid distributing means preferably comprises a fluid distributing member which extends in a direction substantially transverse to the fluid stream and/or fluid flow. One or more of such members may be affixed to the interior surface of the energy transmitting cover member and/or the energy absorbing surface of the base member. Such distributing members are preferably formed of a trough or the like having a series of apertures along the bottom thereof. The fluid collects in the troughs and is evenly distributed along the adjacent surface by the spaced apertures. The distributing members provide more even distribution of the fluid as it flows along the surfaces to increase the surface area which is contacted by the fluid and, in addition, tend to reduce the speed of the flowing fluid to increase the time that the fluid is in contact with the surfaces along which it flows. Both of these factors enhance the quantity of energy which is absorbed by the fluid.

The stream causing means and/or the flow directing means may be operated continuously or intermittently. In the latter case, the circulation pump connected to the collector inlet port can be actuated by a timing circuit or a thermostat such that fluid flow takes place for relatively short periods between which are relatively long periods during which the energy absorbing surface of the collector is permitted to heat. In accordance with these and other objects which may hereinafter appear, the present invention relates to a solar energy collector, as described in the following specification and recited in the annexed claims, taken together with the accompanying drawings, wherein like numerals refer to like parts, and in which:

FIG. 4 is a cross-sectional view taken along line 4—4 of the collector illustrated in FIG. 3;

FIG. 5 is a perspective view of a third preferred embodiment of the present invention;

FIG. 6 is a cross-sectional view taken along line 6—6 of the collector illustrated in FIG. 5.

Figure 3:
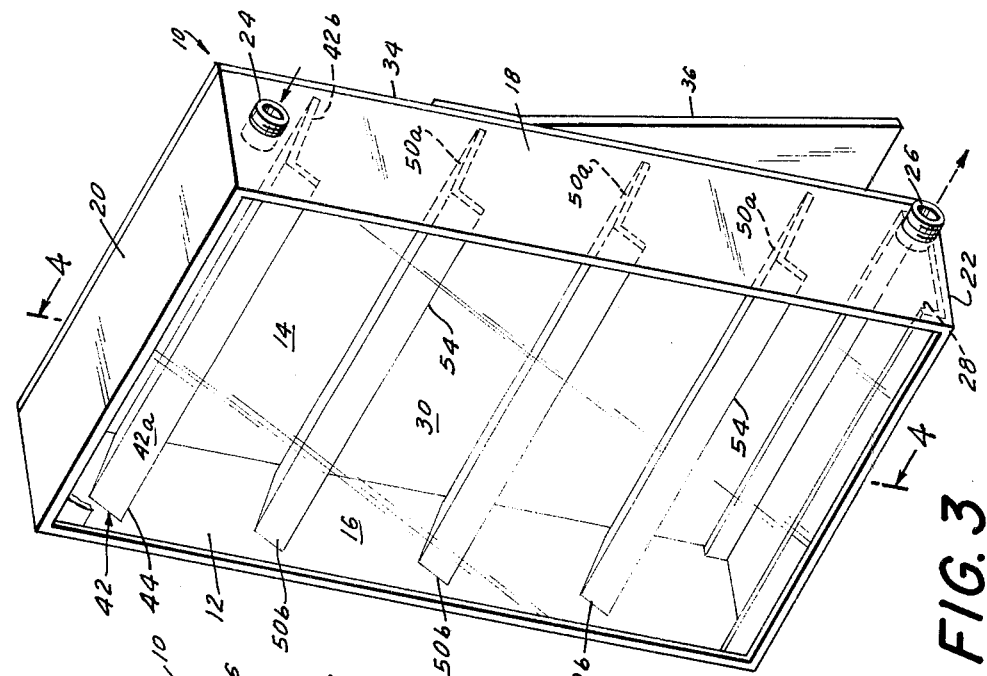
FIG. 3 is a perspective view of a second preferred embodiment of the present invention.

The solar energy collectors illustrated in FIGS. 1 through 6 each comprise an enclosure 10, having a cover member 12, a base member 14, side members 16 and 18 and top and bottom members 20 and 22, all of which are fastened together in boxlike fashion by conventional means. Enclosure 10 is sealed such that it is substantially airtight except for fluid inlet port 24 and fluid outlet port 26 which are, respectively, openings in side 14 of the enclosure. The fluid inlet port is designed to be connected to a supply conduit which, in turn, is connected to a source of fluid. The fluid outlet part 26 is designed to be connected to a fluid return conduit.

Figure 7:
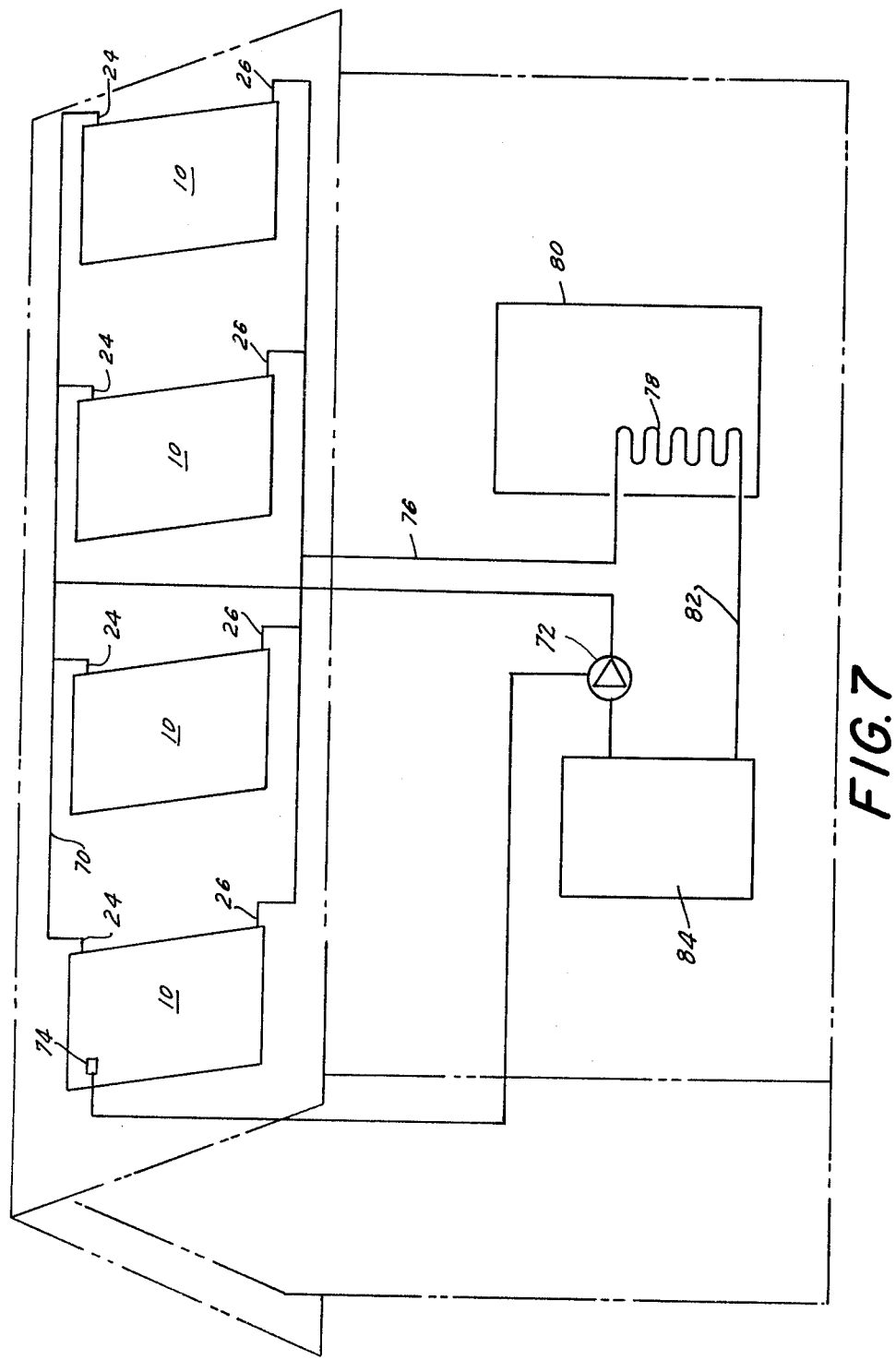
FIG. 7 is a semi-schematic diagram of a solar energy collection system of the type incorporating the collectors of the present invention.

As is explained in greater detail with respect to FIG. 7, fluid such as water or the like is pumped through the supply conduit into inlet port 24. The fluid flows, by means of gravity, through enclosure 10 from the top thereof to the bottom thereof at which is located a collection trough 28. A collection trough 28 empties into fluid outlet 26 such that the fluid travels through a return pipe to a heat exchanger. In the heat exchanger the heat energy which was captured by the fluid, as it flowed through the enclosure, is removed and utilized for purposes such as heating or the like.

Cover member 12 has solar energy transmitting properties and, thus, permits the passage of light from the sun therethrough. Cover member 12 can be made of any light transmitting material, preferably transparent in nature, such as glass or plastic. More specifically, cover member 12 can be made of a single or multiple panes of glass, a rigid sheet or sheets of plastic or a relatively flexible sheet or sheets of plastic which are maintained in a taut state by the structure which mounts same to sides 14 and 16, top 20 and bottom 22 of enclosure 10.

Base member 14 is composed of a noncorrosive material, such as aluminum or the like, and is provided on its interior surface 30 with an energy absorbing coating of black paint or the like. Energy absorbing surface 30 of base member 14 is spaced from the interior surface 32 of cover member 12 so as to provide an air space therebetween. The rear or exgterior surface of base member 14 is preferably provided with a layer of insulating material 34 composed of plastic, mineral wool, or other heat insulating substance which is affixed to the rear or exterior surface of base member 14 by any suitable means such as adhesive or the like.

For the proper operation of the collector, the enclosure must be inclined with respect to the horizontal at an angle such that adhesion forces between the fluid and surface 32 are greater than the gravitational forces on the fluid. This will permit a thin stream or film of fluid to flow along surface 32 of cover member 12, from the top to the bottom thereof, without dripping off. In other words, the angle of inclination of the enclosure must be such that fluid dispensed to the upper portion of the interior surface 32 of cover member 12 will run down along the surface to collecting member 28.

It has been experimentally determined that if cover member 12 is made of plastic or glass and has a substantially planar interior surface 32, water or other similar fluid will adhere to the surface as long as same is not inclined with respect to the horizontal at an angle less than 30°. When the surface is inclined with respect to the horizontal at an angle greater than 30°, at least a substantial portion of the water flowing over the surface will tend to adhere to or cling to the surface as it is caused by gravity to flow to the bottom thereof. This is particularly true when means are provided to evenly distribute the stream or film of water along the surface. It should be appreciated, however, that fluids having other properties may require that the enclosure be inclined within a different range of angles with respect to the horizontal. However, the appropriate range of angles of inclination with respect to the horizontal to be used with any particular fluid can easily be determined by one skilled in the art through routine experimentation.

Enclosure 10 may be designed for freestanding use, such as in a garden or on top of a horizontal roof or may be designed for mounting on an inclined roof. When designed for freestanding use or use on a horizontal roof, a stand 36 or other suitable support means connected to the rear of the enclosure may be employed. If the enclosure is designed for use on an inclined roof which has the appropriate angle of inclination, the enclosure may be affixed directly to the roof by suitable mounting structure with the rear surface adjacent the roof. In this instance, it is also possible, especially in a new building installation, to design the enclosure to be a part of the roof itself with the exterior surface of the roof itself being substituted for base member 14. If the enclosure is designed for use on an inclined roof which does not have a suitable angle of inclination, appropriate mounting means must be provided such that the enclosure is mounted to the roof in a manner which orientates same at an appropriate angle with respect to the horizontal. It should, however, be appreciated that the particular support means, or mounting means, which is utilized in conjunction with the enclosure forms no portion of the present invention and is of the type of structure which would routinely be designed by one skilled in the art in accordance with the mounting requirement for a particular application.

In conventional solar energy collectors, fluid enters the top of the enclosure and flows along the energy absorbing surface of the base member, by means of gravity, and is collected at a trough or the like located at the bottom of the enclosure. Sunlight travels through the cover member, hits the energy absorbing surface of the base member and heats same. The fluid, as it flows over the energy absorbing surface of the base member, captures the heat energy therefrom and transfers same to an energy extracting device such as a heat exchanger.

As energy is absorbed by the fluid as it flows through the enclosure, a portion of the fluid evaporates and, thereafter, condenses on the cooler interior surfaces of the enclosure such as interior surface 32 of cover member 12. This condensation creates a "fog" or a "mist" on the interior surface of cover member 12 which prevents a substantial amount of the incident light from reaching the energy absorbing surface of the base member.

Moreover, as fluid condenses, it gives up its heat of evaporation. In this case, the heat of evaporation was extracted from the energy absorbing surface and, therefore, cannot be utilized. In a conventional solar collector, the heat of evaporation given up by the fluid as it condenses on the interior surface of the cover member is transmitted through the cover member and, thus, lost to the environment. In addition, as light enters the collector and heats the energy absorbing surface. A substantial amount of this heat is radiated back to the interior surface of the cover member. The heat imparted to the cover member in the above identified ways is transmitted through the cover to the environment and lost.

As the evaporation-condensation cycle takes place, the air within the enclosure is normally saturated and, thus, has a relatively high vapor pressure. The high vapor pressure will normally result in vapor leakage from the enclosure if same is not sealed to a very high degree. Leakage of vapor results in heat loss because the leaking vapor contains heat of evaporation.

One of the main features of the present invention is to provide a solar heat collector, substantially as described above, with a means of washing the interior surface 32 of cover member 12 to remove the condensation and to capture the heat therefrom. In this manner, the heat on the cover member can be utilized effectively. In doing so, the vapor pressure within the enclosure is substantially reduced thereby diminishing the amount of vapor which escapes. Reduction of the vapor pressure within the enclosure reduces heat loss and also reduces the criticality of the sealing structure utilized and, thus, permits less expensive enclosures to be designed.

Washing of the interior surface 32 of cover member 12 is accomplished by causing a thin stream or continuous film of fluid to flow along interior surface 32. This result may be accomplished by one of several different structures. It is preferable, although not necessary, that the structure which is utilized to cause the stream of fluid to flow along the interior surface of the cover member be the same structure which is utilized to impart a flow of fluid along the energy absorbing surface of the base member.

It is also preferable to provide structure active on the stream, as it flows along interior surface 32, to evenly distribute the stream or film of fluid across interior surface 32. In addition, it is preferable to provide structure located along the path of fluid flow adjacent energy absorbing surface 30 of base member 14 to evenly distribute the fluid across surface 30. It is also preferable, although not necessary, that the structure for distributing the stream across surface 32 and the structure for distributing the fluid across surface 30 constitute the same structure.

Figure 2:
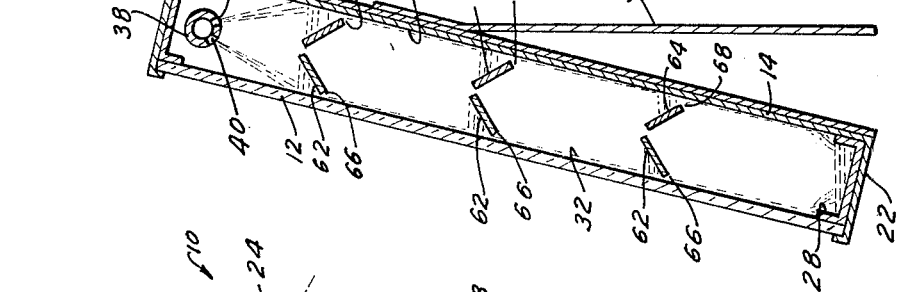
FIG. 2 is a cross-sectional view taken along line 1—1 of the collector illustrated in FIG. 1.
Figure 1:
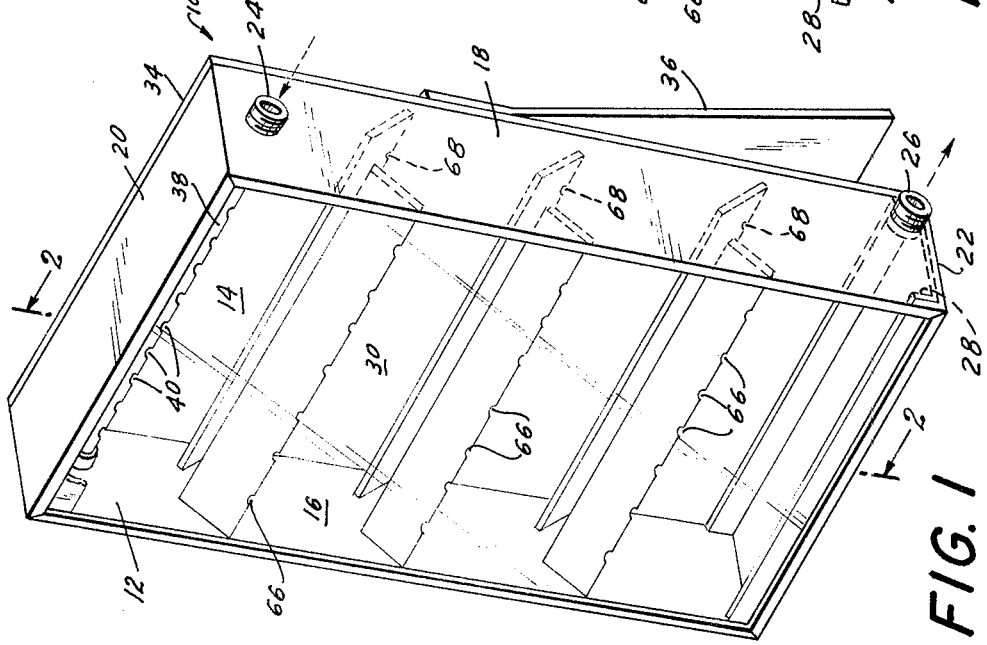
FIG. 1 is a perspective view of a first preferred embodiment of the present invention.

The means for causing a stream of fluid to flow along interior surface 32 of cover member 12 may take the form of a means for spraying fluid onto the interior surface 32 of cover member 12, as is illustrated in the embodiment shown in FIGS. 1 and 2, as well as the embodiment shown in FIGS. 5 and 6. An alternate means for causing a stream of fluid to flow along interior surface 32 of cover member 12 is illustrated by the fluid dispensing means shown in the embodiment of FIGS. 3 and 4.

As illustrated in the embodiment of FIGS. 1 and 2, and in the embodiment of FIGS. 5 and 6, the fluid spraying means comprises a tube or conduit 38 which has one end thereof connected to inlet port 24 and the other end thereof sealed. Along the length of conduit 38, on the portion thereof facing interior surface 32 of cover member 12, are a set of openings or apertures 40. When fluid is supplied under pressure to conduit 38 through fluid inlet 24, the fluid passes through apertures 40 such that it is sprayed on the interior surface 32 of cover member 12. The spray creates a stream or film of fluid which flows along the interior surface 32, because of gravity, until it reaches the collection trough 28 located at the bottom of the enclosure. As the fluid stream flows along interior surface 32, it removes the condensation thereon and captures heat energy from the cover member. The fluid is collected in trough 28 which, in turn, is connected to the return pipe through fluid outlet port 26.

In the embodiment shown in FIGS. 3 and 4, the stream causing means is a fluid dispensing means in the form of a dispensing member 42 which is mounted on, and extends from, the interior surface 30 of base member 14 towards interior surface 32 of cover member 12. Member 42, when viewed edgewise (FIG. 5), has a substantially inverted "check" shape. The exterior edge 44 of member 42 is in close proximity, but spaced a small distance from, interior surface 32 of cover member 12. The longer section 42a of member 42 forms, with the portion of surface 30 adjacent thereto, a temporary fluid retaining means or trough which will serve to collect fluid therebetween. This retaining means is adjacent fluid inlet port 24 such that as fluid passes through fluid inlet port 24, it will collect between portion 42a of member 42 and the adjacent portion of surface 30 until sufficient fluid is collected to cause the fluid to run over the apex of member 42 between portion 42a and 42b. After the fluid flows over the apex between portions 42a and 42b of member 42, it will run along the surface of portion 42b to edge 44 which is in close proximity to, but spaced from, the interior surface 32. Because edge 44 is in close proximity to interior surface 32, edge 44 will act as a fluid outlet means which will dispense fluid onto the interior surface 32 in a thin stream or film. As before, the thin stream or film of fluid will adhere to the interior surface 32 as it is caused, by gravity, to travel therealong to the bottom of interior surface 32 and, thus, be collected in trough 28.

As noted above, the means for causing a stream of fluid to flow along the interior surface 32 of cover member 12 is preferably utilized in conjunction with a means for imparting a flow of fluid to the energy absorbing surface 30 of base member 14. When both fluid flows are employed, it is preferable to utilize the same structure for creating both. In the embodiments of the present invention which utilize the spraying means to cause fluid to flow along the interior surface 32, this spraying means can be conveniently utilized to impart the flow of fluid along surface 30 by simply creating a second set of apertures or holes 46 (FIG. 2) facing surface 30 such that the fluid introduced into conduit 38 under pressure not only sprays through apertures 40 onto the interior surface 32, but also simultaneously sprays through apertures 46 onto interior surface 30.

When the means for causing a stream of fluid to flow along the interior surface 32 of cover member 12 takes the form of the fluid dispensing means, as illustrated in the embodiment of FIGS. 3 and 4, a means for imparting a flow of fluid to energy absorbing surface 30 can be created simply by forming one or more openings or apertures 48 along the junction between portion 42a of member 40 and the energy absorbing surface 30, such that a portion of the fluid which is retained temporarily therebetween will exit the bottom thereof and flow along the energy absorbing surface 30.

Regardless of the structure of the means for causing the stream of fluid to flow along the interior surface of the cover member, it is preferable to include means, located at spaced intervals along the path of the stream of fluid, for distributing the fluid across interior surface 32. As shown in the embodiment of FIGS. 3 and 4, the distribution means may comprise a plurality of members 50, identical in structure and function to dispensing member 42, which are situated in substantially transverse relationship to the fluid flow. Each of the members 50 has a portion 50a connected to, and extending from, surface 30 with a number of apertures or holes 52 at the junction therebetween. Each of the portions 50a meets surface 30 in a manner to temporarily retain fluid therebetween, such that same can exit through apertures 52 in a relatively even distribution across surface 30. Each of the members 50 also has a portion 50b with an edge 54 which extends in close proximity to, but is spaced from, interior surface 32 and which serves to evenly distribute the stream or film of fluid across surface 32.

In the embodiment shown in FIGS. 5 and 6, the distribution means takes the form of a plurality of members 56 which, when viewed edgewise (FIG. 6), appear to have an inverted "V"-shape. Members 56 extend from interior surface 30 to interior surface 32 such that two fluid retaining troughs, one situated between portion 56a and surface 30, and one situated between portion 56b and surface 32, are created. At the bottom of each of these troughs, respectively, are provided a series of apertures 58 and 60 distributed evenly across the length of the member 56 which permit fluid temporarily retained in the trough to be evenly distributed along the adjacent interior surface.

The distribution means may also take the form shown in FIGS. 1 and 2. In this embodiment, the distribution means comprise planar members 62 and/or 64 which extend inwardly and at an acute angle from surfaces 30 or 32 and have a series of outlets or apertures 66, 68, respectively, along the bottom thereof. Members 62 and 64 function in the identical manner as distribution members 56, but comprise separate members instead of a single member with a structure such as member 56.

The distribution means serve a dual purpose. First, they tend to slow down the fluid flow through the enclosure such that more heat may be absorbed thereby. Second, they spread the fluid more evenly over the interior surfaces such that more heat energy may be absorbed by the fluid.

FIG. 7 is a schematic diagram illustrating the manner in which a plurality of enclosures 10 could be utilized in a residential hot water heating system. A plurality of enclosures 10, four of which are shown, are mounted on the roof of a house, the roof having the appropriate angle of inclination. Each of the inlet ports 24 are connected to a supply conduit 70, preferably formed of plastic pipe. Supply conduit 70 is fed by an electric pump 72 which may be continuously operated but which is preferably actuated by a theromostatic control 74 located adjacent the energy absorbing surface of the base member of one of the enclosures 10. Thermostate 74 is set to actuate circulation pump 72 when the temperature of the energy absorbing surface adjacent thereto reaches a first predetermined level and to deactuate circulation pump 72 when the temperature reaches a second predetermined level, lower than the first predetermined level. As an alternate means of intermittently actuating circulation pump 72, a timing circuit (not shown) may be employed.

The outlet ports 26 of each of the enclosure 10 are connected to a return conduit 76 which feeds a heat exchanger coil 78 located in an insulated water storage tank or accumulator 80 which feeds the radiator system and heats a domestic hot water heater, both of which are not shown. The accumulator 80 is preferably of the type described in detail in Applications Ser. Nos. 916,855, filed June 19, 1978 and 954,909, filed Oct. 26, 1978, both entitled "Method And Apparatus For Conservation of Energy in a Hot Water Heating System".

Fluid from heat exchanger 78 is then directed, by means of conduit 82, to a tank or reservoir 84 which, in turn, feeds circulation pump 72. Tank or reservoir 84 preferably has sufficient capacity to contain all of the fluid in the system, such that the system can be drained to avoid freezing.

It will now be appreciated that the solar energy collector of the present invention has greatly improved efficiency of operation, as compared with conventional solar energy collectors of this type. The increased efficiency of operation is a result of the washing of the interior surface of the cover member to remove fluid condensation and to capture the energy thereon. The removal of the condensation on the interior surface of the cover permits a high degree of light from the sun, which reaches the collector, to hit the energy absorbing surface of the base member. The capture of the heat energy in the cover member, imparted thereto by the passage therethrough of light from the sun, by heat reflected from the energy absorbing surface, and from the heat of evaporation of the condensed fluid, permits use of this heat which would normally be lost to the environment. In addition, removal of the condensation reduces the vapor pressure from within the enclosure so as to reduce vapor leaks and, thus, loss of the heat of evaporation therein.

The means for washing the interior surface of the cover member is preferably utilized in conjunction with a means for imparting flow along the energy absorbing surface of the base member. Distribution means are preferably provided to insure even distribution of the fluid across the interior surfaces of the enclosure to decrease the speed of flow and increase the amount of surface area over which the fluid flows.

It should also be appreciated that the collectors of the present invention are formed of relatively inexpensive and reliably functioning parts and, thus, the collector of the present invention can be manufactured and installed and operated for approximately the same costs as conventional solar energy collectors of this type.

While only a limited number of preferred embodiments have been disclosed herein for purposes of illustration, it is obvious that many modifications and variations could be made thereto. It is intended to cover all of these variations and modifications which fall within the scope of the following claims:

We claim:

1. A solar energy collector comprising a solar energy absorbing base member having an interior surface, a solar energy transmitting cover member, having an interior surface, means for mounting said base member and said cover member in spaced relation, with said respective interior surfaces facing each other, so as to form an air space therebetween, a source of a heat exchange liquid medium, means, operably connected to said liquid source, for forming first and second liquid streams and for imparting said streams to said interior surface of said cover member and said interior surface of said base member, respectively, means for collecting the liquid after said streams have flowed along said respective interior surfaces, and means for connecting said liquid collecting means to a means for extracting heat from said collected liquid.

2. The collector of claim 1, wherein said stream forming and imparting means comprises a conduit connected to said source and having first and second sets of liquid outlets ports, each set of said ports being directed towards a different one of said interior surfaces.

3. The collector of claim 1, wherein said stream forming and imparting means comprises means situated between said interior surfaces having a first member inclined towards said interior surface of said cover member and a second member inclined towards said interior surface of said base member, each of said inclined members having a portion thereof spaced from the surface towards which same is inclined to permit limited liquid flow therebetween.

4. The collector of claim 3, wherein said spaced portion forms a liquid port.

5. The collector of claim 1, further comprising means for distributing said first stream across said interior surface of said cover member.

6. The collector of claim 5, wherein said distributing means comprises a member having a surface inclined towards said interior surface of said cover member, at least a portion of which is spaced from said interior surface of said cover member to permit liquid flow therebetween.

7. The collector of claim 6, wherein said spaced portion forms a liquid port.

* * * * *